| United States Patent [19] | [11] 3,936,847 |
|---|---|
| Erlichman | [45] Feb. 3, 1976 |

[54] SHAFT DRIVE AND CONTROL SYSTEM FOR AUTOMATIC CAMERA

[75] Inventor: Irving Erlichman, Wayland, Mass.

[73] Assignee: Polaroid Corporation, Cambridge, Mass.

[22] Filed: July 1, 1974

[21] Appl. No.: 484,407

[52] U.S. Cl. .................. 354/152; 354/86; 354/153; 354/158; 354/173
[51] Int. Cl.² ......................................... G03B 19/12
[58] Field of Search ........... 354/152, 153, 158, 173, 354/83, 85, 86

[56] References Cited
UNITED STATES PATENTS
3,714,879  2/1973  Land ............................ 354/158 X
3,771,427  11/1973 Blinow ............................ 354/158

*Primary Examiner*—Monroe H. Hayes
*Attorney, Agent, or Firm*—John W. Ericson

[57] ABSTRACT

A shaft drive and control system for an automatic camera having a plurality of shaft driven devices operable in a photographic cycle at different times and at different speeds, in which the camera has a film pack receiving well, and comprising an electric motor mounted in one end of the camera at one end of the well and coupled to a dual harmonic drive unit that effects a shaft speed reduction to the lowest speed required for camera operation. A cam driven by the output shaft of the harmonic drive unit serves to recock a reflex mirror in the camera. A first shaft speed increasing system including an elongated timing belt extends down the side of the camera from the output shaft of the harmonic drive unit to a shaft driven at an intermediate speed that acts at times to drive a film unit out of the film pack in the well into engagement with a pair of processing rolls. A second shaft speed increasing system is connected between the intermediate speed shaft and processing rolls mounted in the front of the camera to drive the processing rolls at the highest shaft speed required for camera operation.

7 Claims, 9 Drawing Figures

SHAFT DRIVE AND CONTROL SYSTEM FOR AUTOMATIC CAMERA

This invention relates to photography, and particularly to a novel shaft control system for automatic cameras.

A highly automated and sophisticated camera has been developed and marketed as the Polaroid Land SX-70 reflex camera, manufactured and sold by Polaroid Corporation of Cambridge, Massachusetts, U.S.A. A particular embodiment of this camera is shown and described, for example, in U.S. Pat. No. 3,714,879, issued on Feb. 6, 1973 to Edwin H. Land, Igor Blinow and Vaito K. Eloranta for REFLEX CAMERA, and assigned to the assignee of this application. As there more fully shown and described, the camera is a fully automatic single lens reflex that is foldable into a thin compact shape. When erected, and supplied with a cassette including film units and a battery, the camera responds to the touch of a button to produce a photograph that is immediately driven out of the camera, and there proceeds to complete its development.

In the process of making an exposure in a camera of the kind described, the shutter is closed and a reflex mirror system is moved from a viewing position to an exposure position. The shutter is then opened, and a photoelectrically determined exposure is made on the outermost film unit in the cassette. The shutter is then closed, and a pick is actuated to advance the exposed film unit into engagement with a pair of processing rolls mounted at the front of the camera. The film unit is driven through the processing rolls under pressure to distribute a supply of film processing composition throughout a photosensitive laminar system in the film unit. The reflex mirror system is then returned to its viewing position, and the shutter is opened.

This summary of the operation of the camera described in the above-cited patent only suggests the complexity of the operating program that is carried out during an exposure cycle, and of the apparatus required to carry out the program when implemented in a form capable of enclosure in the desirably compact confines of the camera when it is in its folded position. In order to attain this desirable compactness of construction, a unique, essentially U-shaped, dual power train was devised. As fully illustrated in the above-cited patent, this power train extends about three sides of the well that receives the film pack, and includes an electric motor at the back of the well. The motor drives a thin, elongated dual gear train extending down the sides of the well. The gear train is connected to a pair of processing rolls that extend across the front of the camera in position to receive a film unit advanced from the film pack in the well.

This dual gear train performs a number of functions, including the transmission of power from the motor at the back of the camera to the processing rolls at the front, shaft speed control functions which reduce the initially high speed of the motor output shaft to various shaft speeds required for operation of the elements of the camera, and the maintenance of the necessary synchronism between several of the parts.

The dual gear train devised for this purpose, and shown in the above-cited patent, is compact, highly efficient and reliable in operation. However, it involves a relatively large number of parts, including a number of shafts which have to be accurately positioned during the assembly of the apparatus. Moreover, a relatively large number of gear meshes, and a number of closely fitting, relatively moving parts, are involved. The result is an inherent susceptibility to varying load demands, or even jamming, during operation, because of minute particles of dust or debris which may accumulate during operation over the life of the apparatus. One object of my invention is to reduce the incidence of problems caused by dust and dirt in apparatus for the purposes described. Other objects of my invention are to simplify the construction and facilitate the manufacture of a power train of the general configuration shown in the above-cited patent, while retaining the functional capabilities of that system.

Briefly, the above and other objects of my invention are attained by a novel combination of expedients which together effect a considerable savings in parts and in the difficulties of manufacturing assembly of the power train. Specifically, there is provided a novel combination electric motor and shaft speed reduction system which is mounted at the back of the camera and has as the exposed moving element an output shaft driven at the lowest speed required for camera operation. This shaft rotates once per cycle, and drives a cam at that speed to recock the reflex mirror assembly.

In the combination motor and shaft speed reduction assembly, the end cap and bearings normally found on the output side of an electric motor are replaced by a unit that combines the functions of end cap and armature shaft bearing with certain of the functions of a harmonic strain wave drive shaft speed reduction unit. A strain wave generator is coupled to the armature shaft of the motor, and operates against a flexible spline that cooperates with a stator formed integral with the motor end cap to produce an intermediate shaft speed within the confines of the shaft speed reducer.

The flexible spline cooperates with and output gear serving as a second speed reduction stage to drive an output shaft that rotates at the speed of one revolution per photographic exposure cycle. The output shaft drives a cam that recocks the mirror, and also drives an output gear that is connected to a smaller gear, located down the side of the camera, through an elongated timing belt. The smaller gear is carried on a shaft which drives the pick pin, in a manner to be described. A larger gear formed integral with the smaller gear drives an output gear journalled in the main housing of the camera at a speed below the shaft speed of the processing rolls.

The processing rolls are journalled in a bed portion of the camera that is pivotally mounted on the main housing to facilitate the loading of a cassette. A drive gear on one of the rolls is driven at the speed required for processing by an input gear that is journalled in the pivoted bed portion. This input gear is larger than the drive gear to facilitate folding the processing rolls out of the way when loading film in the camera.

The input gear on the pivoted bed portion meshes with the output gear in the main housing when the bed portion is swung into operating position. By this arrangement, a compact drive assembly is provided which performs the functions of the dual drive train shown in the above-cited patent with considerably fewer parts.

The manner in which the apparatus of my invention is constructed, and its mode of operation, will best be understood in the light of the following detailed description, together with the accompanying drawings, of a preferred embodiment thereof.

Figure 1:
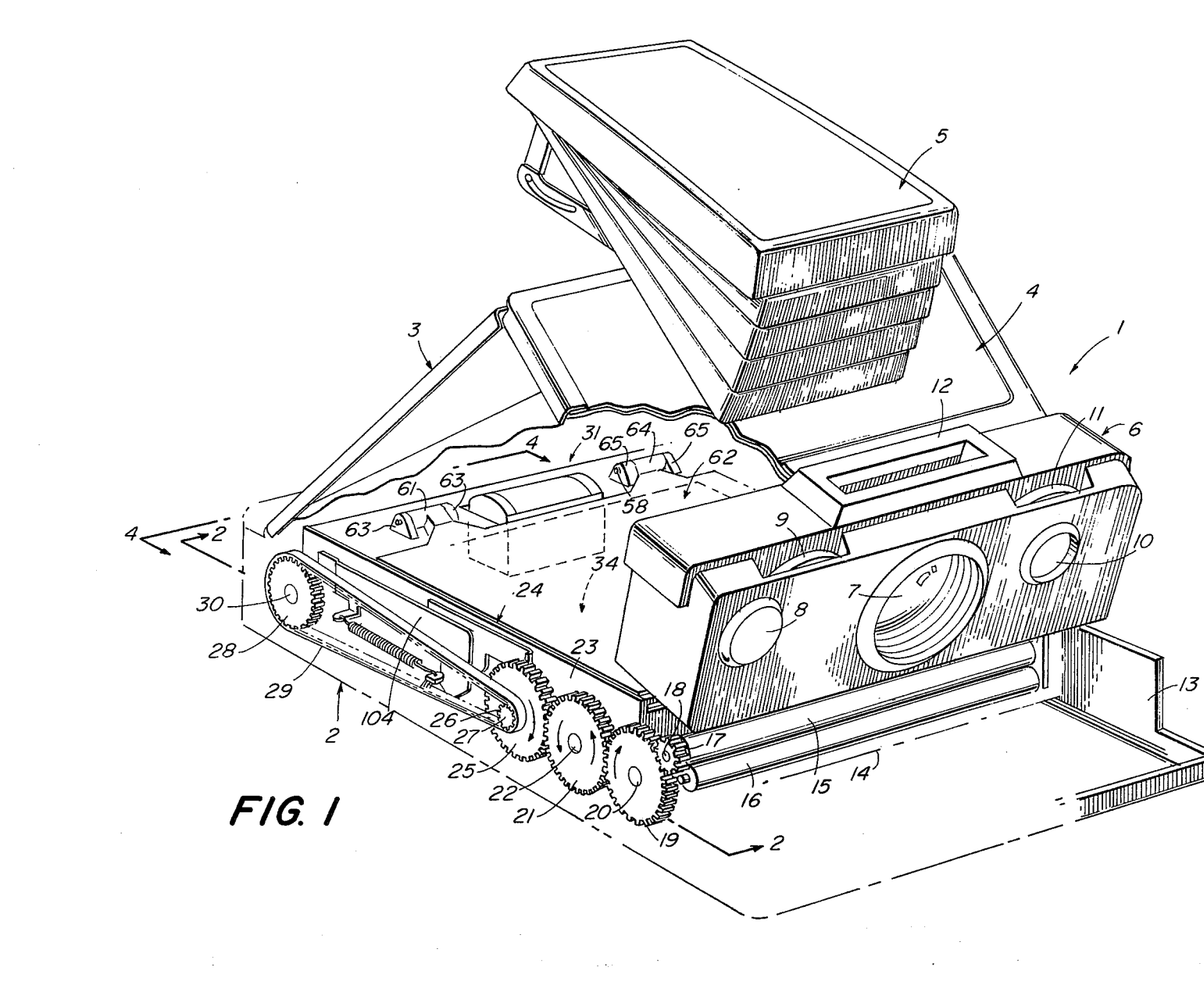
FIG. 1 is a schematic, fragmentary perspective sketch of a camera incorporating the shaft drive and control system of my invention.

Referring now to FIG. 1, I have shown an automatic reflex camera 1 that may be identical to the commercially available Polaroid Land SX-70 camera, or to the particular version shown specifically in the above-cited U.S. Pat. No. 3,714,879, except for the modifications to be described herein. Generally speaking, the camera comprises a main housing suggested at 2 hinged to a rear top panel 3 and a front top panel 4 on which a collapsible viewfinder 5 is mounted. The camera is shown in the erect position in which it is extended for use.

A lens board and shutter housing 6 hinged to the main housing 2 carries a taking lens 7, a shutter button 8, a focusing knob 9, a photocell window 10, an exposure trim control knob 11 and an accessory receptacle 12. The receptacle 12 is adapted to receive a flash bar, for example.

A forward bed portion 13 of the camera is hinged to the main housing 2 in any conventional manner, so that the bed portion 13 can swing down around the axis suggested at 14 to facilitate loading of the camera. For this purpose, referring to FIG. 2, the bed portion 13 comprises side frame members 32 that are hinged to the main housing 2 as suggested at 33.

Figure 2:
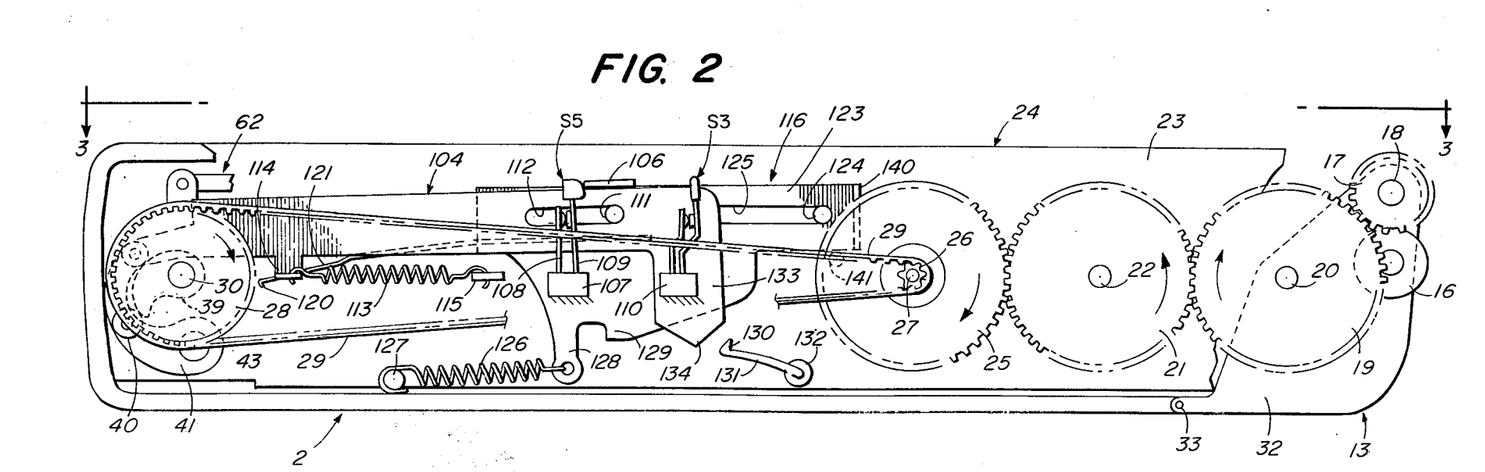
FIG. 2 is a schematic and fragmentary elevational view of the camera of FIG. 1, with parts omitted and parts broken away, taken substantially along the lines 2—2 in FIG. 1.

The bed 13 carries a pair of processing rolls 15 and 16 that are journalled in the frame members 32 for counterrotation when the roll 15 is driven by rotation of a pinion 17 carried on an axle 18 on which the roll 15 is mounted. The pinion 17 is arranged to be driven by a gear 19 journalled on a shaft 20 fixed to the bed 13.

In the position of the bed 13 shown, the gear 19 is in mesh with a gear 21. The gear 21 is rotatably mounted on a shaft 22. The shaft 22 is fixed to a side plate 23. The plate 23 forms an integral part of a modular mounting plate generally designated 24 on which all of the elements of the shaft control system of my invention, except for the movable parts carried with the front bed 13, may be mounted and aligned prior to their assembly in the camera.

The gear 21 couples a gear 25 to the gear 19 when the bed 13 is in the position shown. If desired, the gear 25 may be mounted in place of the gear 21, and the latter omitted. However, the arrangement shown is preferred, because it is desirable for the gear 25 to rotate clockwise as seen in FIGS. 1 and 2, as will appear.

The gear 25 is formed integral with a smaller gear 26, and the integral gears 25 and 26 are rotatably mounted on a shaft 27 that is fixed to the plate 23. The gear 26 is coupled to a gear 28 disposed at the rear of the housing 2 by means here shown as an elongated timing belt 29 of any conventional construction, such as polyurethane, fiber reinforced plastic, or the like. The teeth on the timing belt insure synchronism between the gear 28 and the gear 27. The gear 28 is fixed on a shaft 30 that comprises the output shaft of a combination electric motor and shaft reduction unit generally designated 31.

Figure 3:
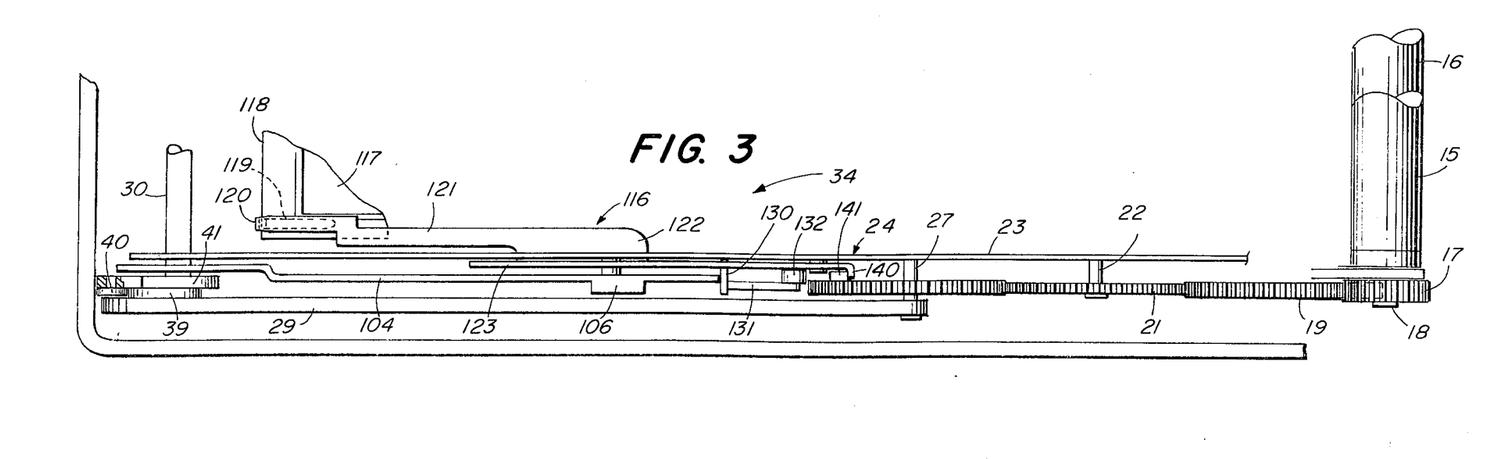
FIG. 3 is a schematic, fragmentary plan view of the apparatus of FIG. 2, taken substantially along the lines 3—3 in FIG. 2.
Figures 7, 8:
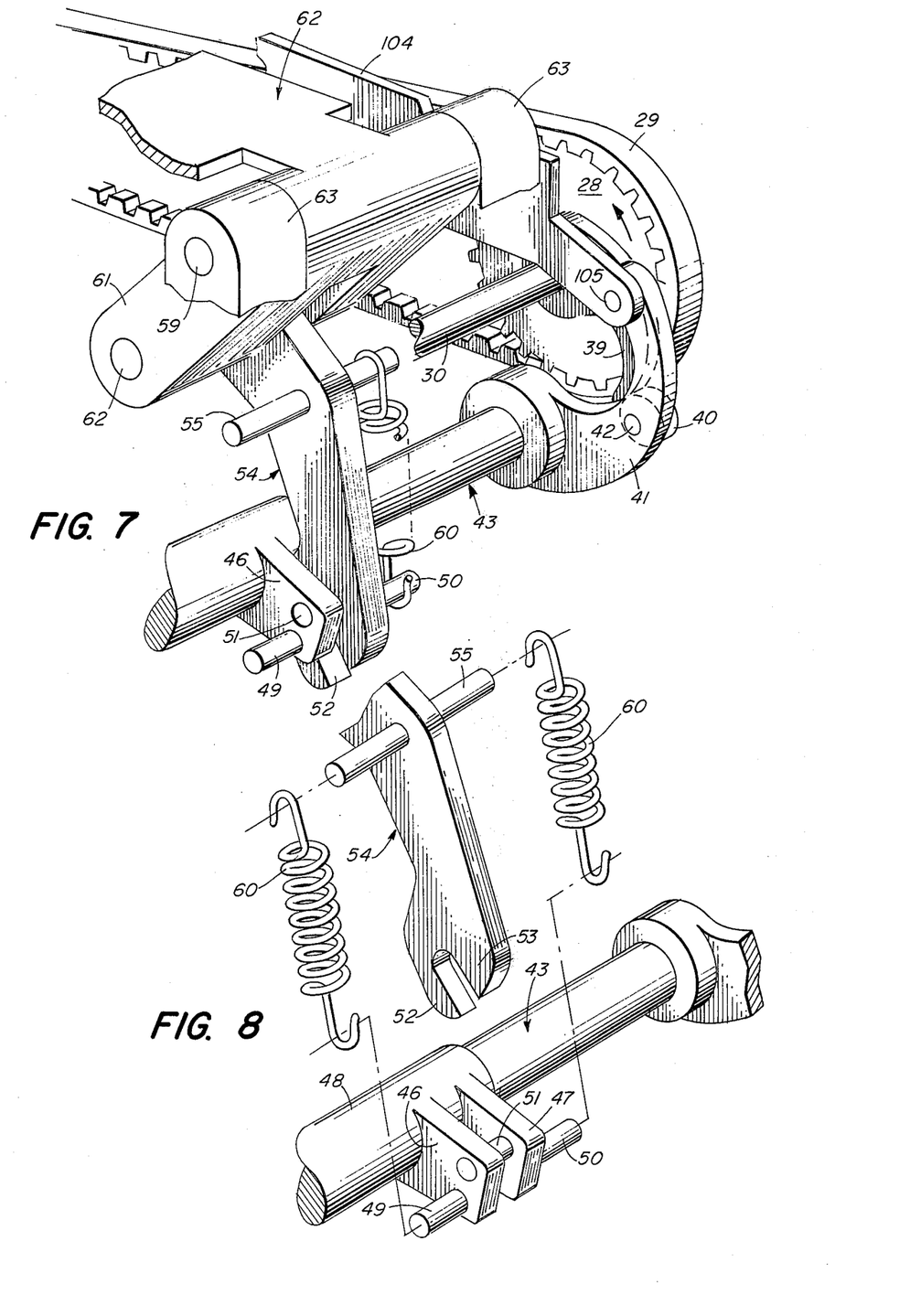
FIG. 7 is a fragmentary perspective sketch of the portion of the mirror control and timing belt drive portions of the shaft control system shown in FIGS. 1 and 6, with parts omitted, parts shown in cross section and parts broken away.
FIG. 8 is a fragmentary exploded schematic perspective sketch, with parts omitted and parts broken away, of a portion of the apparatus of FIG. 7.

Referring next to FIGS. 2, 3 and 7, a cam 39, which may be formed integral with the gear 28, is fixed on the shaft 30. The cam 39 is arranged to rotate once for each exposure cycle in the operation of the camera.

The cam 39 is engaged by a cam follower 40 journalled on a crank arm 41 by means shown as a pin 42. The arm 41 is fixed on a shaft 43.

Figure 9:
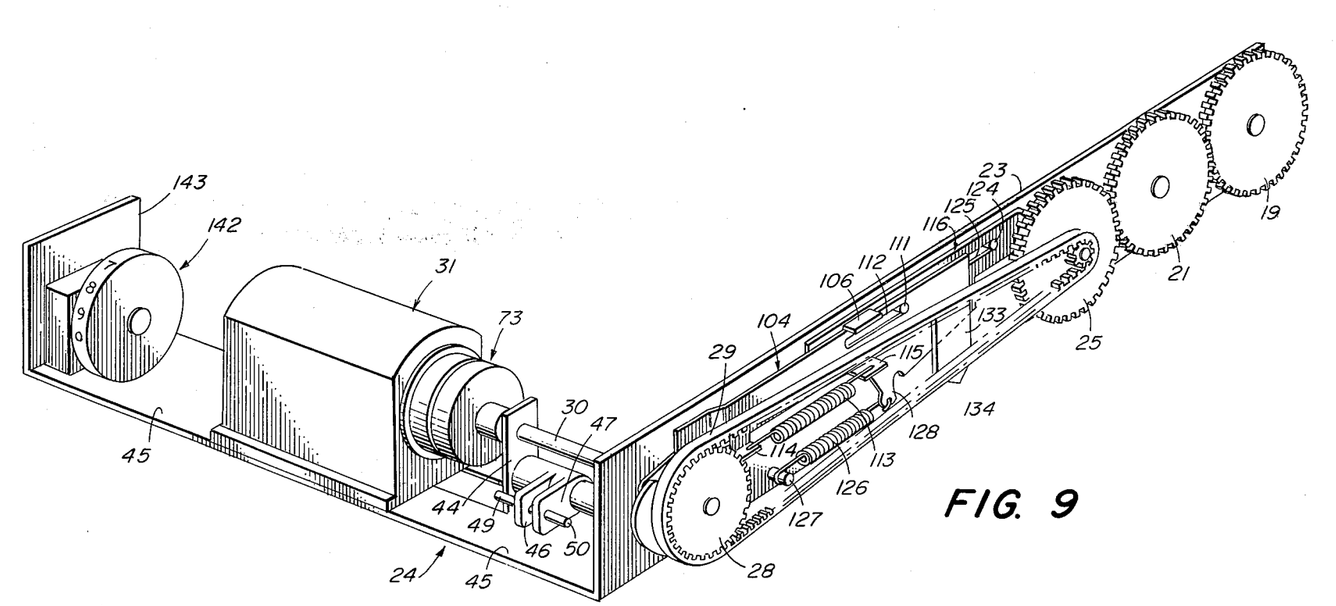
FIG. 9 is a schematic and fragmentary perspective sketch of the apparatus of FIG. 6 as seen from the rear.

The shaft 43 is journalled at one end in a suitable aperture formed in the side plate 23, and at the other end in a suitable aperture formed in an upstanding portion 44 punched out and bent up from the bottom plate 45 of the mounting bracket 24, as best shown in FIG. 9. A suitable aperture formed in the upper portion of the plate 44 provides an intermediate bearing for the output shaft 30.

As shown in FIGS. 4, 7, 8 and 9, a pair of ears 46 and 47 are formed integral with an enlarged end portion 48 of the shaft 43. Pins 49 and 50 are fixed to the ears 46 and 47, respectively. As best shown in FIGS. 7 and 8, a pin 51 is fixed in the ears 46 and 47 and is adapted to extend between the arms 52 and 53 of a yoke formed at the end of a lever 54.

A pin 55 is fixed in the arm 54, and serves to resiliently couple the arm 54 to the ears 46 and 47 by means of interconnecting springs 60. The springs 60 are coupled between the ends of the pins 55 and the pins 49 and 50 as suggested in FIGS. 7 and 8. This construction permits limited excursions of the arm 54 relative to the shaft 43.

The arm 54 is pivotally connected to a yoke 61 by means of a pin 59. The yoke 61 is formed as an integral extension of the reflex mirror assembly 62, as shown in FIGS. 1 and 7, forming a part of the camera more fully described in the above-cited U.S. Pat. No. 3,714,879.

Comparing FIGS. 1 and 7, by this arrangement the mirror arrangement 62 is hinged to lugs 63 affixed to the camera housing on one side. The mirror assembly 62 is hinged to the frame of the camera on the other side by a corresponding hinge assembly comprising a lug 64 formed on one end of the mirror assembly 62 and pivotally connected by a shaft 58 to ears 65 affixed to the camera housing. By this arrangement, the mirror assembly 62 can be swung from the position shown in FIG. 1 to an upper position, in which a generally rectangular cassette receiving well 34 in the housing 2 is exposed to the lens 7 over a path including a taking mirror formed on the bottom side of the assembly 62.

Figure 4:
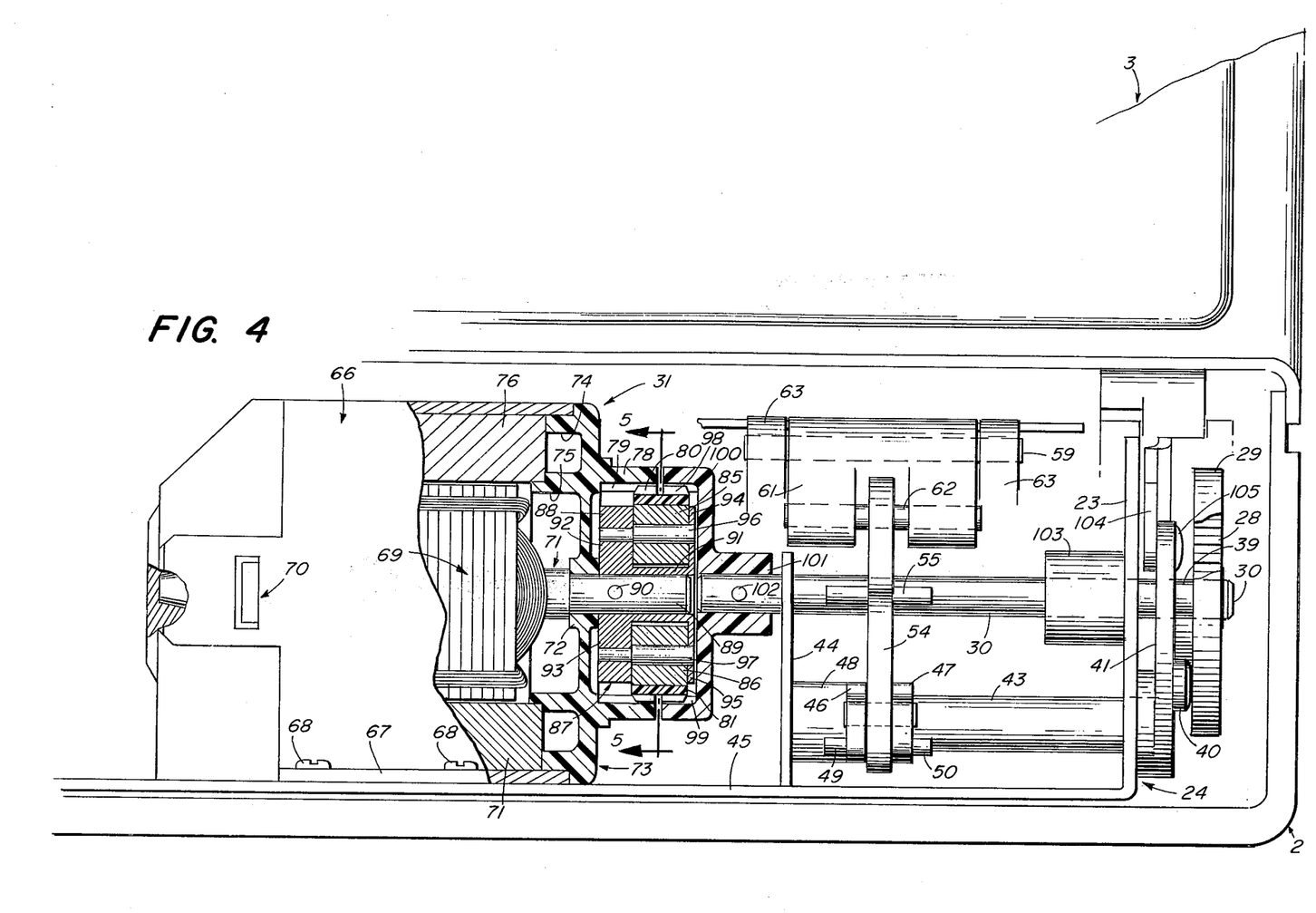
FIG. 4 is a schematic and fragmentary end view of a portion of the apparatus of FIG. 1, with parts shown in cross section, parts omitted and parts broken away, taken substantially along the lines 4—4 in FIG. 1.

Referring next to FIG. 4, the combined electric motor and shaft speed reduction unit 31 may comprise a conventional armature and field assembly enclosed in a main housing 66 having formed integrally thereon a mounting flange 67 by means of which the housing 66 is secured to the base plate 45, with the aid of any suitable fastening means, here shown as machine screws 68. The armature 69 may be of any conventional construction, provided with a commutator, not shown, at the left side of the motor as seen in FIG. 4, communicating with conventional brushes as schematically suggested at 70. Drive and braking current can be supplied to these brushes at times, for the purposes, and by the means described in the above-cited patent.

The output shaft 71 of the armature 69 is journalled in a suitable bearing 72 formed integrally with an end cap 73. The end cap 73 may be molded of a suitable synthetic resin, or made of metal or the like. The end cap 73 is secured to the main housing 66 by means of flanges indicated at 74, and is provided with an annular flange 75 that supports an upper permanent magnet field pole 76, and in spaced cooperative relationship thereto, a lower permanent magnet field pole 77.

An annular stator gear 78 having teeth 79 is formed at the outer end of the end cap 73. This gear 78 serves as the stator of a two-stage harmonic drive shaft speed reduction unit.

Figures 5, 6:
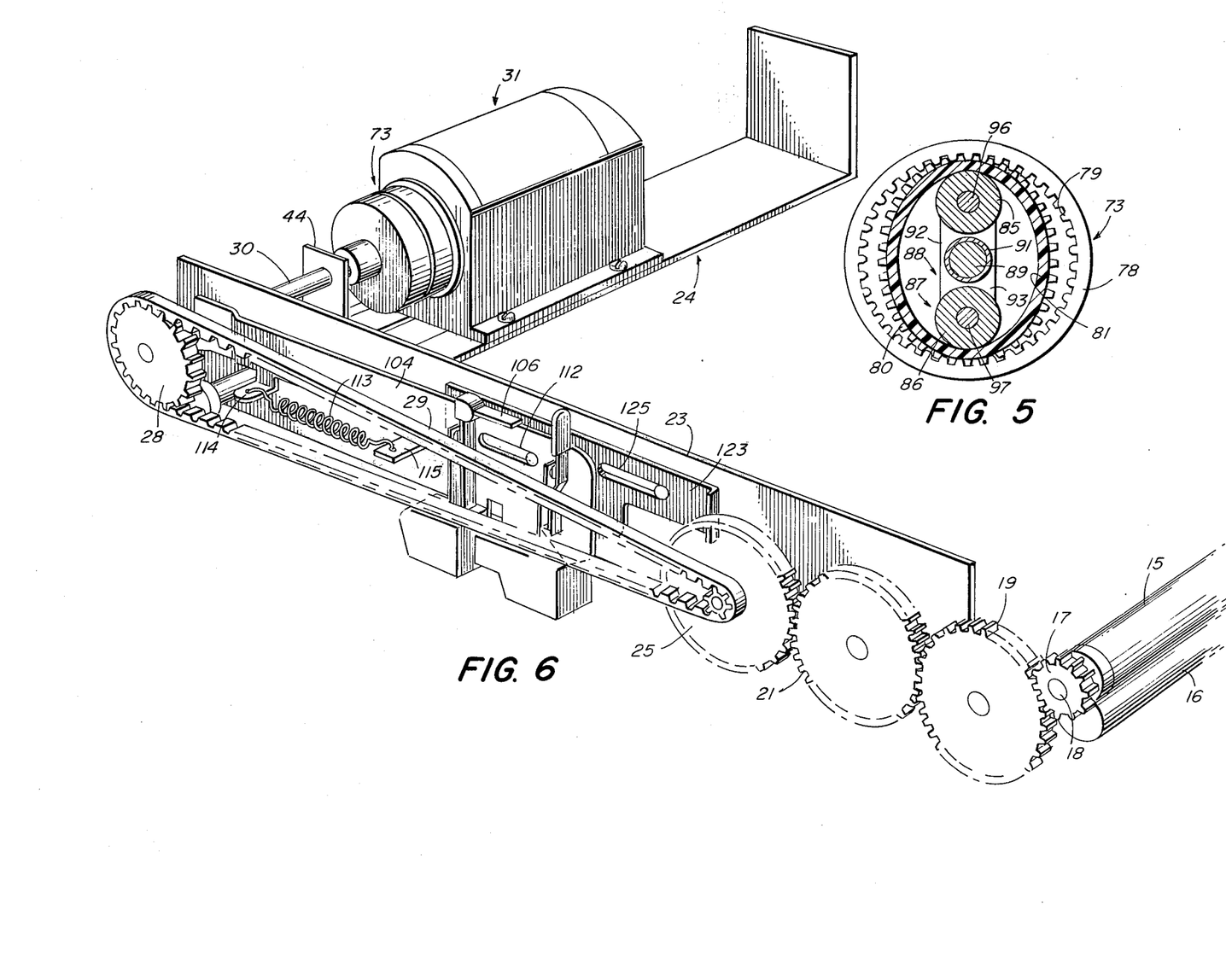
FIG. 5 is a schematic sectional view, with parts shown in cross section and parts omitted, taken substantially along the lines 5—5 in FIG. 4 and showing the output stage of the dual harmonic drive unit portion of the combined motor and shaft reduction unit shown in FIG. 4.
FIG. 6 is a schematic and fragmentary perspective sketch, with parts omitted and parts broken away, showing further details of the shaft control system of FIG. 1.

The teeth 79 of the stator 78 mesh with teeth 80 formed on a flexible band 81, as best shown in FIG. 5, at two diametrically opposed points on the periphery of the band 81, being held in such engagement by a pair of rollers 85 and 86. The rollers 85 and 86 form part of a strain wave generator generally designated 87.

Comparing FIGS. 4 and 5, the strain wave generator comprises a rotor 88 fixed to a reduced portion 89 of the armature shaft 71 by any suitable means, here shown as a pin 90. The rotor 88 comprises a cylindrical hub portion 91 formed integral with a first pair of radially opposed arms 92 and 93, and second axially spaced pair of radially opposed arms 94 and 95.

The rollers 85 and 86 are journalled between the arms 92, 94 and 93, 95, respectively, as shown in FIG. 4, by means illustrated as pins 96 and 97 fixed in the rollers and journalled in the arms. By this arrangement, referring now to FIG. 5, when the shaft 89 rotates clockwise, as seen in FIG. 5, the rotor 88 is carried around clockwise with the shaft 89, and the rollers 85 and 86 rotate counterclockwise about the axes of the pins 96 and 97, respectively, as they roll clockwise on the inner surface of the band 81.

There are preferably provided two fewer teeth 80 on the belt 81 than the number $n$ of teeth 79 on the stator 78. By that arrangement, when the shaft 89 is rotated in one direction at a speed N1, the belt 81 will rotate relative to the stator in the opposite direction and at a speed determined in a known manner as $$N1 \div 1 - \frac{n}{2},$$

where the sign indicates the reversal in direction, and $$1 - \frac{n}{2}$$

is the refraction ratio R1 of the first stage. For example, if the shaft 89 is rotated at 13,000 rpm, there are 56 teeth 79 and 54 teeth 80, the first stage reduction ratio R1 will be −27, and the belt 81 will rotate relative to the stator at a speed of 481 rpm.

Referring again to FIG. 4, a second set of teeth 98 are formed on the band 81. The teeth 98 engage cooperating teeth 99 formed on an annular output gear 100. The gear 100 has a reduced hub portion 101 fixed to the shaft 30 by means shown as a pin 102. There are preferably two more teeth 99 on the output gear than teeth 98 on the belt. If there are 60 teeth on the output gear 100, and 58 teeth 98 on the belt, the reduction ratio R2 given by the second stage will be from the above considerations, $$R2 = 1 - \frac{n}{2} = 1 - \frac{60}{2} = -29.$$

The net reduction ratio Re is given by $$Re = \frac{R1R2}{R1-R2+1}.$$

Thus, with the other exemplary numbers given, the composite reduction ratio will be 261:1, giving an output shaft speed for the shaft 30 of approximately 49.8 rpm, or one revolution per about 1.2 seconds, which corresponds to the basic operating cycle of the camera.

Referring to FIG. 4, a shaft bearing 103 for the shaft 30 is formed integral with the plate 23 and the shaft 30 is carried through this bearing to its fixed connection with the cam 39 and gear 28. Thus, there will be one full revolution of the cam 39 per revolution of the shaft 30. During this revolution, the cam follower 40 will carry the arm 41 through one cycle of operation.

This operation of the arm 41, referring to FIG. 7, comprises a relatively slow clockwise rotation until the maximum radius of the cam 39 engages the cam follower 40, a very rapid counterclockwise rotation of the arm 41 as the follower falls off of the cam 39, under the influence of a spring 113, to be described, and a dwell period. During the counterclockwise rotation of the arm 41, as seen in FIG. 7, the mirror assembly 62 is brought down into the position illustrated in FIG. 1, which is the viewing position of the mirror assembly as more fully described in the above-cited U.S. Pat. No. 3,714,879. In this position, the mirror assembly overlies a well in which a film cassette is adapted to be disposed.

A control arm 104 is pivotally secured to the outer end of the arm 41, as shown in FIGS. 4 and 7, by means indicated as a pivot pin 105. As best shown in FIGS. 2 and 3, the arm 104 has formed integrally thereon a switch-actuating extension 106. In the position of the parts shown in FIG. 2, in which the mirror assembly 62 is in the lower position as shown in FIG. 1, the arm 41 is in its extreme counterclockwise position and the switch actuating element 106 on the control arm 104 closes a switch S5. The switch S5 has a housing 107 secured in any conventional manner to the housing 2, and has a pair of upstanding contact carrying arms 108 and 109. The arms 108 and 109 spring-biased to open their contacts when the actuating element 106 is moved to the right as seen in FIG. 2.

When the cam 39 is rotated clockwise from the position shown in FIG. 2, allowing the arm 41 to rotate clockwise under the influence of the spring 113, the actuating element 106 moves to the right in FIG. 2 and opens a normally closed switch S3. The switch S3 has a switch housing 109 fixed to the camera housing 2 and, as shown, is normally biased to a closed position. The switches S3 and S5 perform control functions in the manner described in the above-cited patent. In particular, the switches S5 and S3 correspond to the switches 270 and 390 described in the patent, respectively.

The arm 104 is guided for movement between the position shown in FIG. 2 and a position in which it will open the switch S3 by means shown as a pin 111 affixed to the plate 23 and guided in a slot 112 formed in the arm 104. The arm 104, and the interconnecting linkage comprising the arm 41 and shaft 43, the arm 54 (FIG. 4) and the mirror assembly 62 are biased towards the position in which the mirror is open and raised to an exposure position, by a spring 113, FIG. 2, connected between an extension 114 formed integral with the arm 104 and a support 115 formed integrally with the housing 2. Accordingly, when the mirror is in its upper, or photographic exposure position, and the shaft 30 is rotated clockwise as seen in FIG. 2, the mirror will be cocked back to its viewing position against the force of the spring 113. When the cam follower 40 on the arm 41 falls off of the cam 39 as the cam is rotated further clockwise, the mirror will fly up to its taking position under the force supplied by the spring 113.

Referring particularly to FIGS. 2 and 3, a pick assembly generally designated 116 is provided for initially advancing a film unit fragmentarily shown at 117 from its exposure position in a cassette fragmentarily shown at 118 into engagement with the rolls 15 and 16 after an exposure has been made. For this purpose, the cassette is formed with a slot 119 through which the rear corner of the film unit 117 is exposed, and where the corner of the film unit can be engaged by a pick arm 120 spring-biased down into engagement with the top corner of the cassette. The pick arm 120 extends through a resilient arm 121 to a cross arm 122 that passes through a suitable slot, not shown for clarity, formed in the plate 23, and is there affixed to or formed integral with a slide 123.

The slide 123 is guided for movement between the position shown in FIG. 2, and a position to the right of that shown in FIG. 2, by means of the pin 111 and a pin 124 fixed to the plate 23 in cooperating slots, only partly shown in FIG. 2 for clarity, such as 125. This slide 123 is urged to the position shown in FIG. 2 by a spring 126 extending between a pin 127 fixed to the plate 23 and a connection to an arm 128 formed integrally with the slide 123. The slide 123 is formed with a latching member 129 that is adapted to be caught on a hook 130 when the slide 123 is moved sufficiently to the right in FIG. 2. The hook 130 is formed on a resilient arm 131 fixed to a post 132. The post 132 is fixed to the plate 23.

A depending end 133 of the arm 104 is formed with the cam surface 134 that is adapted to engage a transverse extension of the hook 130, as will be seen in comparing FIGS. 2 and 3, thereby releasing the slide 123 when it is latched by engagement of its hook 129 with the hook 130. The purpose of this arrangement will be described below.

The end 140 of the slide 123 is bent outwardly, as shown in FIGS. 2 and 3, to adapt it to be engaged by a pin 141 fixed to the gear 25. The ratio of the gears 28 and 26 is selected to provide a 4:1 reduction ratio between the speed of the shaft 30 and the speed of the shaft 27. Accordingly, the pin 141 makes four revolutions per operating cycle of the camera.

During one of these revolutions, as will be described, the pin 141 engages the end 140 of the slide 123 and carries the slide to the right in FIG. 2, against the force of spring 126, until the hook 129 engages the hook 130. The pin 141 then passes below the end 140 of the slide 123, and the slide remains in its latched position. During this movement of the slide 123 to the right, a film unit 117 is advanced into engagement with the rolls 15 and 16.

The pick waits in its advanced position until the mirror is recocked, with concomitant motion of the slide 104 to the left from its extreme right position in FIG. 3, whereupon the cam 134 formed on the arm 104 moves the hook 130 down to release the slide 123, and allow it to snap back to the left under the action of the spring 126.

Having described the construction of the apparatus of my invention, its operation will next be described. For purposes of matters of detail which are not pertinent to my invention, and in respects in which the operation is identical, reference will be made to the above-cited U.S. Pat. No. 3,714,879, the entirety of which is hereby incorporated herein by reference.

Referring first to FIG. 1, the overall operation of the camera will be briefly reviewed, assuming that the camera is in its erect position as shown in FIG. 1 and that it is loaded with film, and that the mirror assembly is down in the position shown, in which the camera is adapted for viewing and focusing. When the shutter button 8 is depressed, the first operation is that the shutter of the camera, not shown, is closed. The motor and drive unit 31 is then run briefly to release the mirror. In this regard, it is noted that in the standby condition of the camera, the cam 39 is essentially in the position shown in FIG. 2, wherein the cam follower 40 is on a dwell portion at the maximum radius of the cam 39. Brief operation of the unit 31 causes the cam 39 to be rotated enough to the right to allow the cam follower to drop off the cam 39, allowing the mirror assembly 62 to fly up into its taking position. When that occurs, the arm 104 is snapped to the right in FIG. 2 by the spring 113. The switch S5 is first opened and the switch S3 is then opened. Opening the switch S3 causes the motor 31 to stop, and begins a timing interval provided to allow the mirror assembly to come to a full stop in its upper position, through circuit means described in the above-cited patent and not essential to the understanding of my invention.

The cam surface 134 formed on the arm 104 will pass over the hook 130, depressing it and then releasing it without any other operation taking place. Following the timing interval begun when the switch S3 is opened, an exposure cycle is begun during which the shutter is opened and then closed. The circuits described in the above-cited patent then cause the motor 31 to be operated, whereupon the shaft 30 in FIG. 2 will commence to rotate clockwise from a position, somewhat clockwise from the position shown, in which the cam follower 40 is down on the lowest radius dwell portion of the cam 39.

As this second operation of the motor begins, the pin 141 will engage the stop 140 formed on the slide 123 and carry the pick arm 120 to the right as seen in FIG. 3, advancing the topmost film unit 117 into engagement with the rolls 15 and 16. During this operation, referring to FIGS. 2 and 3, the rolls 15 and 16 will be rotated at a ratio selected by the relative diameters of gears 17 and 19. A ratio of 2.5:1 has been found satisfactory for this purpose.

It will be apparent that the apparatus of my invention permits the shaft speed and timing functions required in a camera such as that described in U.S. Pat. No. 3,714,879 to be carried out with the aid of considerably fewer parts. Another considerable advantage is that the shaft drive and timing chain can be preassembled on the frame 24, and installed as a unit in the camera housing. As indicated in FIG. 9, a mechanical counter 142 may also be installed on the frame 24, by mounting either on the base plate portion 45 or on an upstanding integral end plate 143. The plate 143 provides a convenient point of attachment to the left side of the camera housing.

While I have described my invention with reference to the details of a particular embodiment thereof, many changes and variations will occur to those skilled in the art upon reading this description, and such may obviously be made without departing from the scope of my invention.

Having thus described my invention, what I claim is:

1. A unitary shaft drive and control assembly for use in an automatic camera having a generally rectangular well for receiving a film pack, comprising a first shaft, an electric motor, a two-stage strain wave drive shaft speed reducer connected berween said electric motor and said first shaft, a generally L-shaped mounting plate having a first portion and a second portion, said first portion extending at right angles to said first portion and said first portion being perpendicular to said second portion, said plate being adapted to be mounted in the camera along two sides of the well, means mounting said electric motor and said shaft speed reducer on said first portion of said mounting plate, means comprising a bearing formed on said second portion for mounting said first shaft on said first portion and extending through said second portion for rotation about an axis normal to said second portion, a first gear having a first diameter fixed to said first shaft for rotation therewith, a cam fixed to said first shaft for rotation therewith, a second gear having a smaller diameter than said first gear, means rotatably mounting said second gear on said second portion, a timing belt connecting said first gear to said second gear, and an actuating element connected to said second gear for rotation therewith.

2. The apparatus of claim 1, further comprising a cam follower, means movable mounting said cam follower on said second portion in engagement with said cam for movement therewith, a pick assembly slidably mounted on said second portion for movement between first and second positions, means resiliently urging said pick assembly towards its first position, means formed on said pick assembly and engageable by said actuating element when said pick assembly is in its first position to drive said pick assembly to its second position when said second gear is rotated over a predetermined arc, detent means releaseably latching said pick assembly in its second position, and means driven by said cam follower for releasing said detent means at a predetermined angle in the rotation of said first shaft.

3. A shaft drive and control mechanism for an automatic camera having a predetermined operating cycle, comprising a motor having an output shaft rotatable at a first speed when said motor is energized, a second shaft, harmonic drive means connected between said output shaft and said second shaft to drive said second shaft at a second speed equal to one revolution per operating cycle of said camera, a cam connected to said second shaft for rotation therewith, a first gear connected to said second shaft for rotation therewith, a second gear smaller than said first gear, means rotatably mounting said second shaft and said second gear in spaced relation, a timing belt driveably connecting said first gear to said second gear, the ratio of said first and second gears being selected to cause said second gear to rotate through an integral number of revolutions per operating cycle of said camera, and an actuating element connected to said second gear for rotation therewith.

4. A shaft drive and control system for an automatic camera having a film pack receiving well and having three shaft driven devices operable in a photographic cycle at different times and at different speeds, said system comprising an electric motor mounted in one end of the camera at a first end of the well, a first shaft adapted to be coupled to the shaft driven device in the camera that operates at the lowest speed, a dual harmonic drive unit coupled between said motor and said first shaft to drive said first shaft at said lowest speed when said motor is energized, a second shaft adapted to be coupled to the shaft driven device in the camera that operates at the highest speed, a third shaft rotatably mounted in said camera on a side of said well and adapted to be coupled to the shaft driven device in the camera that operates at an intermediate speed, first shaft speed increasing means comprising an elongated timing belt extending down the side of the camera from said first shaft to said third shaft, a first gear coupling said timing belt to said first shaft and a second gear coupling said timing belt to said third shaft, and second shaft speed increasing means driveably connecting said third shaft to said second shaft.

5. In a reflex camera having a predetermined operating cycle, the combination comprising, a housing, means forming a rectangular framing aperture in said housing, means forming a generally rectangular compartment in said housing adapted to receive a supply of film units, mirror means mounted in said housing for movement between a first position and a second position, spring means biasing said mirror means toward its first position, a first shaft, means mounting said first shaft in said housing outside of said compartment for rotation about an axis parallel to and adjacent a first side of said compartment, electric motor means mounted in said housing adjacent said first side of said compartment, harmonic drive shaft speed reducing means connecting said motor means to said first shaft to rotate said first shaft through one revolution for each operating cycle of said camera, a second shaft, means mounting said second shaft in said housing outside of said compartment for rotation about an axis parallel to and adjacent a second side of said compartment opposite said first side, processing means located in said housing and driveable to process individual film units advanced from said compartment into engagement with said processing means, means driveably connecting said second shaft to said processing means to drive said processing means when said second shaft means is rotated, shaft speed increasing means comprising an elongated flexible timing belt extending outside of and along a third side of said compartment and coupling said first shaft means to said second shaft means, a cam mounted on said first shaft and means engaged by said cam over a first angle of rotation of said first shaft for driving said mirror means from its first position to its second position.

6. In a reflex camera, the combination comprising means forming a housing, means forming a generally rectangular compartment in said housing adapted to receive a supply of film units, mirror means mounted in said housing for rotation about a first axis parallel to a first side of said compartment between a first position and a second position, processing means mounted in said housing outside of said compartment adjacent a second side of said compartment opposite said first side and driveable to process individual film units advanced from said compartment into engagement with said processing means, film unit advancing means operable to engage a film unit in said compartment and exposed in said framing aperture and advance the film unit into engagement with said processing means, motor means mounted in said housing outside of said compartment adjacent said first side of said framing aperture, a first shaft, means mounting said first shaft in said housing for rotation about an axis parallel to said first side, two-stage strain wave drive shaft speed reducing means driveably coupling said motor means to said first shaft, actuating means comprising a cam connected to said first shaft and means engaged by said cam over a first angle of rotation of said first shaft for moving said mirror means from its first position to its second position, a second shaft, means mounting said second shaft in said housing outside said compartment on a third side of said compartment for rotation about an axis parallel to said first side, first shaft speed increasing means driveably connecting said second shaft to said processing means, second shaft speed increasing means comprising an elongated flexible timing belt in said housing outside of said compartment extending parallel to said third side and driveably coupling said first shaft to said third shaft, an actuating element connected to said third shaft for rotation therewith, and means engaged by said actuating element over a second angle of rotation of said first shaft for operating said film unit advancing means.

7. In a reflex camera having a predetermined operating cycle, the combination comprising, a housing, means forming a rectangular framing aperture in said housing, means forming a compartment in said housing adapted to receive a supply of film units, mirror means mounted in said housing for movement between a first position and a second position, spring means biasing said mirror means toward its first position, a first shaft means mounting said first shaft in said housing outside of said compartment for rotation about an axis parallel to and adjacent a first side of said compartment, motor means mounted in said housing adjacent said first side of said compartment, harmonic drive shaft speed reducing means coupling said motor means to said first shaft to rotate said first shaft through one revolution for each operating cycle of said camera, a second shaft, means mounting said second shaft in said housing outside of said compartment for rotation about an axis parallel to and adjacent a second side of said framing aperture opposite said first side, processing means located in said housing and driveable to process individual film units advanced from said compartment into engagement with said processing means, means driveably connecting said second shaft means to said processing means to drive said processing means when said second shaft means is rotated, a third shaft, means rotatably mounting said third shaft in said housing outside said compartment on a third side of said compartment between said first and second sides, first shaft speed increasing means driveably connecting said first shaft and said third shaft, second shaft speed increasing means driveably connecting said third shaft to said second shaft, a cam connected to said first shaft, means engaged by said cam over a first angle of rotation of said first shaft for driving said mirror means from its first position to its second position, actuating means connected to said third shaft, and means engaged by said actuating means over a second angle of rotation of said first shaft for advancing a film unit in said compartment into engagement with said processing means.

* * * * *